3,074,844
INSECTICIDE
Zen'ichi Ogita, Osaka, Japan, assignor to Nihon Nohyaku Kabushiki Kaisha, Tokyo, Japan, a corporation of Japan
No Drawing. Filed Mar. 23, 1959, Ser. No. 800,960
Claims priority, application Japan June 27, 1958
14 Claims. (Cl. 167—22)

The present invention relates to a new combination of insecticides. More particularly, the present invention is concerned with a new insecticidally-active composition which comprises a certain agent having toxic effect against vermin in the combination with a particular agent negatively correlating to the aforesaid agent and a suitable carrier, the former agent being an organic chlorine-containing agent or an organic phosphorus-containing agent and the latter agent being a negatively correlating compound to the former from among the substances having the general formula

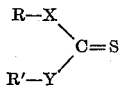

wherein R and R' represent alkyl, aryl, aralkyl, halogeno aryl or aralkylene radical or hydrogen atom, X and Y represent

=O, =S, =NH, —NH$_2$, —NHR, —NH·NH— or —N=. For example, when X and Y represent —NH—, the general formula shows thiourea derivatives which have only larvicidal action to insects, and also when X represents =N— and Y is absent in this formula, the formula shows isothiocyanate derivatives which have adulticidal action.

The term, "negative correlation," and the similar expression thereof, as employed in the present invention, mean that the one agent has an inset-controlling activity in the antagonistic manner to the insecticidal activity of the other agent. Organic chlorine-containing agents and organic phosphorus containing agents, as employed in the present invention, will be specified hereinafter.

In agriculture or gardening, various agents were previously used for controlling and combating noxious organisms. In these days, however, it should be seriously considered that such noxious organisms as having a resistance to these agents have appeared. Thus, it is very serious problem in the chemotherapeutic treatment in agricultural and medical fields, that noxious insects obtain a resistance to dichlorodiphenyl trichloroethane, hexachlorocyclohexane, O,O-diethyl-p-nitrophenyl thiophosphate, nicotine sulfate and the like, and that bacteria obtain a resistance to antibiotics such as streptomycin and penicillin or sulfathiazole. Although a fair amount of studies on the development of the resistance to these drugs has been constantly made, there is not yet obtained any clearly agreeable conclusion with the respect to the mechanism of a resistance, upon which the measure of controlling noxious organisms depends.

By Pratt, J. J., and Babers, F. H. (cf. Science 112, 141 (1950)), Weiner, R., and Crow, J. F. (cf. Science 113, 403 (1951)), and Tsukamoto, M., et al. (cf. Proc. Intern. Genet. Symposia 442 (1956)), it was found that resistances of strain of Drosophila melanogaster to dichloro-diphenyl trichloroethane, γ-hexachloro-cyclohexane, methoxychlor, octachloro tetrahydromethanoindene and parathion are developed in the crossed manner in each other. Even in case of the strain having crossed resistance as explained above, a resistance to nicotine sulfate is not always shown. Therefore, it seems that these two resistances are dependent upon two different factors respectively.

Now the inventor has found that strain of D. melanogaster characterized by resistance to dichloro-diphenyl trichloroethane, γ-hexachlorocyclohexane, and other insecticides is susceptible to phenyl thiourea (PTU) and p-chlorophenyl thiourea (p-Cl-PTU); that is, the cross resistance pattern of dichloro-diphenyl trichloroethane, hexachlorocyclohexane, and parathion is negatively correlated with PTU and p-Cl-PTU, and also have studied on the genetical relation between resistance to PTU and p-Cl-PTU, and that to other insecticides. The parts of data from the results of the genetical analysis are summarized as in Table 1 hereinafter. For the convenience of genetical analyses PTU which was employed as larvicide, was used instead of isothiocyanate derivatives which had adulticidal action.

As shown in Table 1, the results of genetical anaylsis indicate that the resistance to PTU of a concentration more than 3 mM simultaneously requires a recessive factor on the 2nd chromosome and a dominant factor on the 3rd chromosome, and that PTU-resistance is negatively correlated with that to dichloro-diphenyl trichloroethane, hexachlorocyclohexane, O,O-diethyl-p-nitrophenyl thiophosphate.

Then, in the meanwhile, the loci of PTU-resistant gene on the 2nd and 3rd chromosomes have been exactly determined. From these observations, it has been supposed that the dominant gene (II, 64–66) on the 2nd chromosome which confers resistance to dichloro-diphenyl trichloroethane, hexachlorocyclohexane, O,O-diethyl-p-nitrophenyl thiophosphate, also confers extraordinary susceptibility to PTU, while the gene (III, 50±) on the 3rd chromosome which confers resistance to nicotine sulfate, also confers resistance to PTU.

Accordingly, it may be concluded that PTU-susceptibility results form the pleiotropic expression of the dominant gene for resistance to dichloro-diphenyl trichloroethane, hexachlorocyclohexane, O,O-diethyl-p-nitrophenyl thiophosphate on the 2nd chromosome.

Therefore, all strains of Drosophila melanogaster may be killed by exposing to the mixture of the minimum amount of PTU which kills strains resistant to dichloro-diphenyl trichloroethane and of the small amount of dichloro-diphenyl trichloroethane which is enough to kill strains resistant to PTU (i.e., susceptible to dichlorodiphenyl trichloroethane).

In order to test the assumption, the following backcross was carried out by using a dichloro-diphenyl trichloroethane, nicotine sulfate-resistance strain (Hikone-R31, wild strain) and a dichloro-diphenyl trichloroethane, nicotine sulfate-susceptible strain (bw; st ss, multichromosomal mutant strain).

bw; st ss♀ × F$_1$ (bw; st ss♀ × Hikone-R31♂) ♂

The relation between the phenotypes and the number of surviving flies emerging from the treated media was studied by using the larval test method; that is, each 50 larval obtained from bw; st ss female and F$_1$ male were put into small glass vials containing 20 ml. of dry yeast medium (agar 2 gr., dry yeast powder 3 gr., sugar 4 gr., water 100 ml.) with or without insecticides. A part of the data obtained is shown in Table 1.

TABLE 1

*The Number of $F_2$-Flies of Phenotype in the Backcross bw; st ss♀ × $F_1$ (bw; st ss♀ × Hikone-$R_{31}$♂) ♂, of 500 $F_2$-Larvae Tested by Larval Test Method*

| Phenotype | bw; st ss | bw | st ss | + |
|---|---|---|---|---|
| Genotype | $\frac{bw\ st\ ss}{bw\ st\ ss}$ | $\frac{bw\ st\ ss}{bw\ \text{R-NS}}$ | $\frac{bw\ st\ ss}{\text{R-DDT}\ st\ ss}$ | $\frac{bw\ st\ ss}{\text{R-DDT}\ \text{R-NS}}$ |
| DDT, BHC, parathion | S | S | R | R |
| nicotine sulfate | S | R | S | R |
| Control | 121 | 111 | 121 | 137 |
| DDT, 0.5 mM | 18 | 9 | 110 | 116 |
| DDT, 1.0 mM | 2 | 2 | 88 | 115 |
| DDT, 1.5 mM | 0 | 0 | 90 | 98 |
| DDT, 2.0 mM | 0 | 0 | 97 | 96 |
| DDT, 10.0 mM | 0 | 0 | 99 | 101 |
| PTU, 3.0 mM | 0 | 114 | 0 | 0 |
| PTU, 5.0 mM | 0 | 109 | 0 | 0 |
| PTU, 3.0 mM+DDT, 0.5 mM | 0 | 101 | 0 | 0 |
| PTU, 3.0 mM+DDT, 1.0 mM | 0 | 71 | 0 | 0 |
| PTU, 3.0 mM+DDT, 1.5 mM | 0 | 0 | 0 | 0 |
| PTU, 3.0 mM+DDT, 2.0 mM | 0 | 0 | 0 | 0 |
| PTU, 5.0 mM+DDT, 0.5 mM | 0 | 113 | 0 | 0 |
| PTU, 5.0 mM+DDT, 1.0 mM | 0 | 71 | 0 | 0 |
| PTU, 5.0 mM+DDT, 1.5 mM | 0 | 0 | 0 | 0 |
| PTU, 5.0 mM+DDT, 2.0 mM | 0 | 0 | 0 | 0 |

NOTES

Hipone-R31: strain being resistant to not only dichloro-diphenyl trichloroethane, but also various insecticides such as hexachlorocyclohexane, O,O-diethyl-p-nitrophenyl thiophosphate, nicotine sulfate etc.
DDT: dichloro-diphenyltrichloroethane.
BHC: hexachlorocyclohexane.
Parathion: (trade name) O,O-diethyl-p-nitrophenyl thiophosphate.
bw; st ss: multichromosomal, dichloro-diphenyl trichlorethane and nicotine sulfate-susceptible strain in which the 2nd and 3rd chromosomes are marked with recessive morphological mutant.
R-DDT: DDT-resistant gene on the 2nd chromosome.
R-NS: nicotine sulfate-resistant gene on the 3rd chromosome.
S: susceptibility.
R: resistance.

bw; ++ flies which carry the 2nd chromosome having DDT-resistant gene in homozygous condition, and the 3rd chromosome having nicotine-resistant gene in heterozygous conditions, emerge from media containing 3 mM of PTU, but bw; st ss of original type, and +; st ss and +; ++ flies which carry the 2nd chromosome having DDT-resistant gene in heterozygous condition do not emerge at all.

The 2nd chromosome which has dichloro-diphenyl trichloroethane resistant gene is completely eliminated, and flies surviving from media containing 3 mM of PTU are those which are only dichloro-diphenyl trichloroethane susceptible.

From these results, it should be understood that the emergence of all flies being either resistant or susceptible to various insecticides may be completely inhibited by the mixture comprising the minimum amount of PTU which kills dichloro-diphenyl trichlorethane resistant flies and the small amount of dichloro-diphenyl trichloroethane which is enough to kill PTU-resistant (dichlorodiphenyl trichloroethane susceptible) flies. On the contrary, flies surviving from media containing nicotine sulfate obtain resistance not only to nicotine, but also to various insecticides such as dichloro-diphenyl trichloroethane, hexachlorocyclohexane, and O,O-diethyl-p-nitrophenyl thiophosphate. Therefore, it should be noticed that insecticide-resistant flies are not completely killed by the mixture comprising any insecticides and the insecticides which is synergistic to the former, and that flies having resistance to these mixture emerge after the continuous usages of said mixture. In this point, a new combined insecticidal composition of the present invention is essentially different from the insecticidal mixture being already used.

Accordingly, an object of the present invention is to provide an insecticidally-active composition comprising such insecticides as being an organic chlorine-containing insecticide or an organic phosphorus-containing insectidide, in the combination with one or more than two compounds negatively correlating to the said insecticide among the substances having the general formula

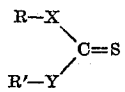

wherein R, R', X and Y are defined as hereinabove, and a suitable carrier. Another object of the present invention is to provide an insecticidally-active composition which is effectively used for controlling the noxious insect without developing the resistance which should be observed after the continuous usage of the conventional insecticide. Other objects and features of the present invention will be understood from the description of the present specification.

In the present invention, organic chlorine-containing agent as used include di-(p-chlorophenyl) trichloroethane, di - (p-chlorophenyl) dichloroethylene, di - (p-chlorophenyl) trichloroethanol, p-chlorophenyl p-chlorobenzene sulfonate, hexachlorocyclohexane, hexachlorohexahydro-endo, exo-dimethanonaphthalene, hexachloro-epoxyoctahydro - endo, exo - dimethanonaphthalene, hexachloro-epoxyoctahydro-endo, endo-dimethanonaphthalene, octachlorotetrahydro-methanoindene, heptachloro-tetrahydromethanoindene, chlorinated dicycloterpene.

Organic phosphorous-containing agent as employed in this invention include O,O-dimethy p-nitrophenyl thiophosphate, O-ethyl p-nitrophenyl thionobenzene phosphonate, O,O-dimethyl dichlorovinyl phosphate, O,O-dimethyl p-chlorophenyl phosphorodithioate, O,O-dimethyl bis-(ethoxycarbonyl) ethyl dithiophosphate.

Among the compounds having the general formula

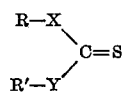

there are included thiourea derivatives such as phenyl thiourea, p-chlorophenyl thiourea and the like as a larvicide, isothiocyanate derivatives such as phenyl isothiocyanate, p-chlorophenyl isothiocyanate and the like as an adulticide.

The carrier used in the present invention may be in solid, liquid or gaseous form. For example, suitable solid carriers in the present invention include various types of clay, kaoline, talc, diatomaceous earth, silica, minorstone powder, etc. Liquid carrier in the present invention may be solvent or non-solvent in which the insecticides can be dissolved or dispersed by addition of any solubilizing agent. That is, solvents used for liquid carrier in this invention include benzene, kerosine, alcohol, acetone, ether, etc., and non-solvents include oils, water, fatty acid, halogenated hydrocarbons and their derivatives. Such non-solvents are used with such surface active agent as emulsifying, dispersing, wetting or penetrating agent, in the present invention. As a suitable gaseous carrier, air, nitrogen, carbon dioxide, methyl chloride, Freon gas and the like are used in the present invention. The proportions of the components of the composition produced by this invention may vary without any limitation, so far as the said components can be blended intimately in order to form a uniform composition.

Now two insecticidal compositions, that are the mixed insecticides A and B, according to the present invention are prepared. The mixed insecticide A consists of 1 gr. of phenyl thiourea, 0.5 gr. of dichloro-diphenyl trichloroethane and 100 ml. of alcohol, and the mixed insecticide B consists of 1 gr. of p-chlorophenyl thiourea, 0.5 gr. of dichloro-diphenyl trichloroethane and 100 ml. of alcohol. The insecticidal activity of these mixed insecticides are compared with those of each components of said insecticides. The results are as shown in Table 2.

The compositions of this invention consisting of thiourea derivatives such as phenyl thiourea and p-chlorophenyl thiourea which are employed as larvicide, when take a part of stomach poison to insects, show their high insecticidal activity. Therefore these compositions are effective for controlling and killing such insects that have a chance to have dietary life during a period of their life span. Such insects include cockroach, ants, bedbug, mosquito larvae and house-fly larvae. On the contrary, the compositions consisting of isothiocyanate derivatives such as phenyl isothiocyanate and p-chlorophenyl isothiocyanate which have severe adulticidal action, are more effective during the period of their life span.

The compositions of this invention can be applied by spraying, residual spraying, scattering, fuming or dipping, or as bait for insects.

Thiourea derivatives as the adding material for the composition of this invention have not any significant toxic effect on human bodies, domestic animals, fabrics, agricultural products and bacteria in soil, and consequently the side effect of the composition of this invention, if appears, may be depending upon the toxicity of the insecticidal agent which is incorporated with the said thiourea derivatives. This invention can provide a strongly effective insecticidal composition having little side effect, especially when a chlorine-containing agent which seems to have the less toxicity, for example dichloro-diphenyl trichloroethane or $\gamma$-hexachloro-cyclohexane, is used in this invention. On the other hand, although a higher concentration of phenyl isothiocyanate among isothiocyanates derivatives occasionally causes a blister on skin, a concentration within the range of customary use has of little significant harmful effect, as clearly shown in animal tests.

Additionally speaking, the influence of thiourea on plants and soil bacteria heretofore was found as follows: When 5 to 25 kg. of thiourea are scattered to a hectare of soil, they do not change the organic substance-decomposing activity of said soil and have not an influence even on the nitrification which seems to be most responsible. Also it was reported that, if 500 kg. of thiourea are used

TABLE 2

*Percentage Emergence at Various Concentrations of PTU, Nicotine Sulfate, DDT and Mixed Insecticides by 7 Strains of D. melanogaster (Adult Test Method)*

| Insecticide | phenyl thiourea | | | | nicotine sulfate | | | | |
|---|---|---|---|---|---|---|---|---|---|
| Concentration | 1 mM | 2 mM | 3 mM | 5 mM | 100 p.p.m. | 200 p.p.m. | 400 p.p.m. | 800 p.p.m. | 1,000 p.p.m. |
| Canton-S | 60.8 | 35.5 | 14.7 | 2.0 | 115.2 | 61.1 | 3.6 | 0 | 0 |
| cn bw | 69.3 | 54.9 | 16.8 | 6.6 | 134.6 | 93.0 | 12.6 | 0 | 0 |
| cn R bw | 11.9 | 0 | 0 | 0 | 106.9 | 92.5 | 67.7 | 10.8 | 0 |
| Hikone-R | 23.0 | 2.9 | 0 | 0 | 96.3 | 97.7 | 88.4 | 54.6 | 2.9 |
| Hikone R31 | 18.1 | 4.2 | 0 | 0 | 96.8 | 104.0 | 69.6 | 26.5 | 1.4 |
| WMB 30 | 54.2 | 3.4 | 0 | 0 | 121.4 | 93.8 | 2.8 | 0 | 0 |
| WMD 7-38 | 32.0 | 4.4 | 0 | 0 | 139.0 | 72.0 | 8.0 | 0 | 0 |

| Insecticide | DDT | | | | | | mixed insecticide | |
|---|---|---|---|---|---|---|---|---|
| | | | | | | | A | B |
| Concentration | 100 p.p.m. | 200 p.p.m. | 400 p.p.m. | 800 p.p.m. | 1,000 p.p.m. | 3,000 p.p.m. | X10 | X10 |
| Canton-S | 0 | 0 | 0 | 0 | 0 | 0 | 0 | 0 |
| cn bw | 2.2 | 3.2 | 0 | 0 | 0 | 0 | 0 | 0 |
| cn R bw | 60.1 | 47.5 | 21.7 | 23.1 | 30.1 | 18.8 | 0 | 0 |
| Hikone-R | 94.2 | 72.0 | 59.4 | 50.5 | 44.6 | 40.1 | 0 | 0 |
| Hikone R31 | 88.4 | 62.6 | 53.9 | 46.8 | 55.4 | 26.0 | 0 | 0 |
| WMB 30 | 87.5 | 88.0 | 54.8 | 48.4 | 47.6 | 32.4 | 0 | 0 |
| WMD 7-38 | 91.3 | 60.9 | 64.4 | 51.5 | 49.7 | 29.0 | 0 | 0 | for one hectare of soil, said thiourea is decomposed for 3 to 6 months to such an extent that it cannot be detected in the soil, and shows a relatively great influence on the nitrification. Consequently, there is no significant influence when a normal concentration is used.

Twelve classes of plants in the soil treated with 2 kg. of thiourea per one hectare were observed. In each case, ordinary growths were observed. When wheat and red clover were treated with 0, 2, 5, 10 and 50 kg. per hectare of thiourea, ordinary growths were observed excepting that the 50 kg. per hectare thiourea-treated red clover shows insufficient growth.

The following examples, which are intended as informative and typical only and not in a limiting sense, will illustrate the present invention. All parts are by weight.

EXAMPLE 1

To 5 parts by weight of dichloro-diphenyl trichloroethane, 8 parts by weight of p-chlorophenyl isothiocyanate and 87 parts by weight of clay are added, and then uniformly mixed and powdered. Thus an insecticidal composition is obtained.

EXAMPLE 2

To 5 parts by weight of γ-hexachlorocyclohexane, 8 parts by weight of phenyl thiourea and 2 parts of alkylaryl sulfonate and 3 parts by weight of polyvinyl alcohol are added and further 82 parts by weight of diatomaceous earth and clay are added. Thereafter the resulting mixture is uniformly mixed and powdered. Thus an insecticidal composition is obtained.

EXAMPLE 3

To 0.5 part by weight of hexachloro-epoxy-octahydro-endo, exo-dimethanonaphthalene, 0.8 part by weight of phenyl isothiocyanate are added. This mixture is dissolved with 10 parts by weight of acetone, 88.5 parts by weight of kerosine and 0.2 part by weight of perfume uniformly. Thus an insecticidal composition is obtained.

EXAMPLE 4

Ten parts by weight of dichloro-diphenyl trichloroethane are dissolved with 50 parts by weight of methylnaphthalene. The resulting solution is added with the solution of 10 parts by weight of p-chloro-phenylisothiocyanate in 20 parts by weight of acetone, and then added with 10 parts by weight of alkylaryl polyoxyethylene glycol ether. Thus an insecticidal composition is obtained.

EXAMPLE 5

Five parts by weight of diethyl isopropyl methylpyrimidyl thionophosphate are dissolved into 77 parts by weight of xylene and kerosine. The resulting solution is mixed with 10 parts by weight of p-chlorophenyl isothiocyanate and then added with 8 parts by weight of alkylaryl polyoxyethylene glycolether. Thus an insecticidal composition is obtained.

EXAMPLE 6

To 5 parts by weight of dichloro-diphenyl trichloroethane, 0.2 part by weight of Diazinone (O,O-diethyl O-(2-isopropyl-4-methyl-6-pyrimidinyl) phosphorothioate) and 5.5 parts by weight of phenyl isothiocyanate are added, and further 89.1 parts by weight of kerosene and 0.2 part by weight of perfume are added. Thereafter the resulting mixture is uniformly dissolved. Thus an insecticidal composition is obtained.

What I claim is:

1. An insecticidal composition comprising an insecticidal compound selected from the group consisting of dichlorodiphenyl trichloroethane; hexachlorocyclohexane; hexachlorohexahydro-endo, exo-dimethanonaphthalene; hexachloro-epoxy octahydro-endo, exo-dimethanonaphthalene; hexachloro-epoxy octahydro-endo, exo-dimethanonaphthalene; hexachloro-epoxy octahydro-endo, endo-dimethanonaphthalene; octachlorotetrahydromethanoindene; heptachlorotetrahydromethanoindene; chlorinated dicycloterpene; O,O-dimethyl p-nitrophenylthiophosphate; o-ethyl p-nitrophenylthiobenzenephosphate; O,O-dimethyl dichlorovinyl phosphate; O,O-dimethyl p-chlorophenyl phosphorodithioate; O,O-dimethyl bis-(ethoxy carbonyl) ethyldithiophosphate; and O,O-isopropyl-4-methyl pyrimidyl-(6)-thionophosphate, an insecticidally negative correlative thereof, and an insecticide carrier, said insecticidally negative correlative being a member selected from the group consisting of a compound of the formula R—N=C=S and a compound of the formula

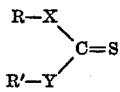

wherein R and R' are the same member selected from the group consisting of H, lower alkyl, phenyl, naphthyl, halogenophenyl and nitrophenyl, and X and Y are the same member selected from the group consisting of O, S, imino and hydrazo, the proportion by weight of first-mentioned insecticidal compound to said insecticidally negative correlative thereof being within the range from 1:1 to 1:2.

2. A solid, insecticidal composition comprising 5% by weight of dichloro-diphenyl trichloroethane and of 8% by weight of p-chlorophenyl isothiocyanate with solid carrier.

3. A solid, insecticidal composition comprising 5% by weight of γ-hexachlorocyclohexane, 8% by weight of phenyl thiourea, 2% by weight of alkylaryl sulfonate with 82% by weight of solid carrier.

4. A liquid, insecticidal composition comprising 0.5% by weight of hexachloro-epoxy-octahydro-endo, exo-dimethanonaphthalene, and 0.8% by weight of phenyl isothiocyanate, with 98.5% by weight of liquid carrier and 0.2% by weight of perfume.

5. A liquid, insecticidal composition comprising 10% by weight of dichloro-diphenyl trichloroethane and 10% by weight of p-chlorophenyl isothiocyanate with 70% by weight of liquid carrier and 10% by weight of surface active agent.

6. A liquid, insecticidal composition comprising 5% by weight of diethyl isopropyl methylpyrimidyl thionophosphate and 10% by weight of p-chlorophenyl isothiocyanate with 77% by weight of liquid carrier and 8% by weight of surface active agent.

7. A liquid, insecticidal composition comprising 5% by weight of dichloro-diphenyl trichloroethane, 0.2% by weight of O,O-diethyl O-(2-isopropyl-4-methyl-6-pyrimidinyl) phosphorothioate and 5.5% by weight of phenyl isothiocyanate with 89.1% by weight of liquid carrier and 0.2% by weight of perfume.

8. The method of combating insecticide-resistant insects which comprises bringing the insects into contact with an insecticidal composition comprising an insecticide selected from the group consisting of dichlorodiphenyl trichloroethane; hexachlorocyclohexane; hexachlorohexahydro-endo, exo-dimethanonaphthalene; hexachloro-epoxy octahydro - endo, exo - dimethanonaphthalene; hexachloro-epoxy octahydro-endo, endo-dimethanonaphthalene; octachlorotetrahydromethanoindene; heptachlorotetrahydromethanoindene; chlorinated dicycloterpene; O,O-dimethyl p-nitrophenylthiophosphate; o-ethyl p-nitrophenylthiobenzenephosphate; O,O-dimethyl dichlorovinyl phosphate; O,O-dimethyl p-chlorophenyl phosphorodithioate; O,O-dimethyl bis-(ethoxy carbonyl) ethyldithiophosphate; and O,O-diethyl-O,O-isopropyl-4-methyl pyrimidyl-(6)-thionophosphate, and insecticidally negative correlative thereof, and an insecticide carrier, said insecticidally negative correlative being a member selected from the group consisting of a compound of the formula R—N=C=S and a compound of the formula

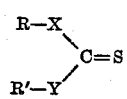

wherein R and R' are the same member selected from the group consisting of H, lower alkyl, phenyl, naphthyl, halogenophenyl and nitrophenyl, and X and Y are the same member selected from the group consisting of O,S, imino and hydrazo, the proportion by weight of first-mentioned insecticidal compound to said insecticidally negative correlative thereof being within the range from 1:1 to 1:2.

9. The method of combating insects which are resistant to dichloro-diphenyl trichloroethane which comprises bringing the insects into contact with a solid, insecticidal composition comprising 5% by weight of dichloro-diphenyl trichloroethane and of 8% by weight of p-chlorophenyl isothiocyanate with solid carrier.

10. The method of combating insects which are resistant to dichloro-diphenyl trichloroethane which comprises bringing the insects into contact with a solid, insecticidal composition comprising 5% by weight of γ-hexachlorocyclohexane, 8% by weight of phenyl thiourea, 2% by weight of alkylaryl sulfonate with 82% by weight of solid carrier.

11. The method of combating insects which are resistant to dichloro-diphenyl trichloroethane which comprises bringing the insects into contact with a liquid, insecticidal composition comprising 0.5% by weight of hexachloro-epoxyoctahydro-endo, exo-dimethano-naphthalene, and 0.8% by weight of phenyl isothiocyanate, with 98.5% by weight of liquid carrier and 0.2% by weight of perfume.

12. The method of combating insects which are resistant to dichloro-diphenyl trichloroethane which comprises bringing the insects into contact with a liquid, insecticidal composition comprising 10% by weight of dichloro-diphenyl trichloroethane and 10% by weight of p-chlorophenyl isothiocyanate with 70% by weight of liquid carrier and 10% by weight of surface active agent.

13. The method of combating insects which are resistant to dichloro-diphenyl trichloroethane which comprises bringing the insects into contact with a liquid, insecticidal composition comprising 5% by weight of diethyl isopropyl methylpyrimidyl thionophosphate and 10% by weight of p-chlorophenyl isothiocyanate with 77% by weight of liquid carrier and 8% by weight of surface active agent.

14. The method of combating insects which are resistant to dichloro-diphenyl trichloroethane which comprises bringing the insects into contact with a liquid, insecticidal composition comprising 5% by weight of dichloro-diphenyl trichloroethane, 0.2% by weight of O,O-diethyl O-(2-isopropyl-4-methyl-6-pyrimidinyl) phosphorothioate and 5.5% by weight of phenyl isothiocyanate with 89.1% by weight of liquid carrier and 0.2% by weight of perfume.

References Cited in the file of this patent

UNITED STATES PATENTS

| | | |
|---|---|---|
| 2,600,431 | Rosenstein | June 17, 1952 |
| 2,906,744 | Jancosek | Sept. 29, 1959 |
| 2,916,414 | Raecke | Dec. 8, 1959 |
| 2,947,661 | Hopkins | Aug. 2, 1960 |

OTHER REFERENCES

Hanna: Handbook of Agricultural Chemicals, 2d ed., 1958, pp. 282, 284.

King: U.S. Dept. of Agr., Handbook, No. 69, May 1954, pp. 127, 145, 203, 325.